US006536290B2

(12) United States Patent
Ochiai

(10) Patent No.: US 6,536,290 B2
(45) Date of Patent: Mar. 25, 2003

(54) ULTRASONIC FLOWMETER AND GAS FLOWMETER USING THE SAME

(75) Inventor: Chitaka Ochiai, Omihachiman (JP)

(73) Assignee: Murata Manufacturing Co., Ltd. (JP)

( * ) Notice: Subject to any disclaimer, the term of this patent is extended or adjusted under 35 U.S.C. 154(b) by 207 days.

(21) Appl. No.: 09/732,050

(22) Filed: Dec. 7, 2000

(65) Prior Publication Data

US 2001/0039839 A1 Nov. 15, 2001

(30) Foreign Application Priority Data

Dec. 7, 1999 (JP) .......................................... 11-347442

(51) Int. Cl.[7] .............................................. G01F 1/66
(52) U.S. Cl. .................................. 73/861.29; 73/861.27
(58) Field of Search ........................ 73/861.27, 861.28, 73/861.29, 861.25

(56) References Cited

U.S. PATENT DOCUMENTS 2,865,196 A * 12/1958 Bordenave et al. ......... 367/902
4,850,220 A * 7/1989 Asano et al. ............. 73/861.28
5,811,689 A * 9/1998 Collier et al. ............ 73/861.27
6,142,015 A * 11/2000 Getman et al. ............ 340/621

* cited by examiner

Primary Examiner—Harshad Patel
(74) Attorney, Agent, or Firm—Ostrolenk, Faber, Gerb & Soffen, LLP

(57) ABSTRACT

A loop flow-path is formed by providing a partition in the path of flow of a fluid duct. An incoming flow-path and an outgoing flow-path are provided with the fluid duct through connecting ducts, and a gas G flows in the fluid duct. An ultrasonic sensor having two opposing surfaces for transmission and reception is disposed in a part of the loop flow-path so that ultrasonic waves to be transmitted and receive have vector components in the direction of the loop flow-path. The ultrasonic waves outputted from the two opposing surfaces of the ultrasonic sensor travel in opposite directions to each other in the loop flow-path, one ultrasonic wave with the flow of the gas and the other ultrasonic wave against the flow of the gas, and are received on the opposite surfaces of the sensor, respectively.

5 Claims, 5 Drawing Sheets

FIG. 6
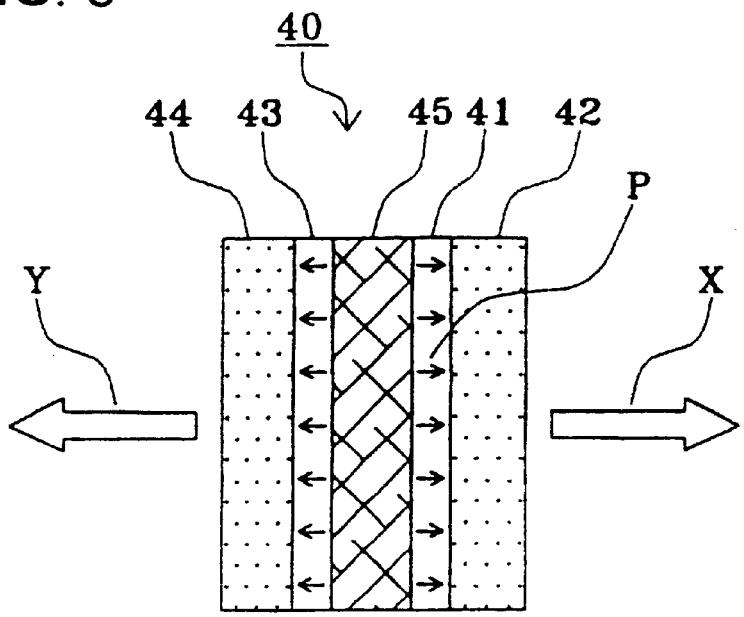
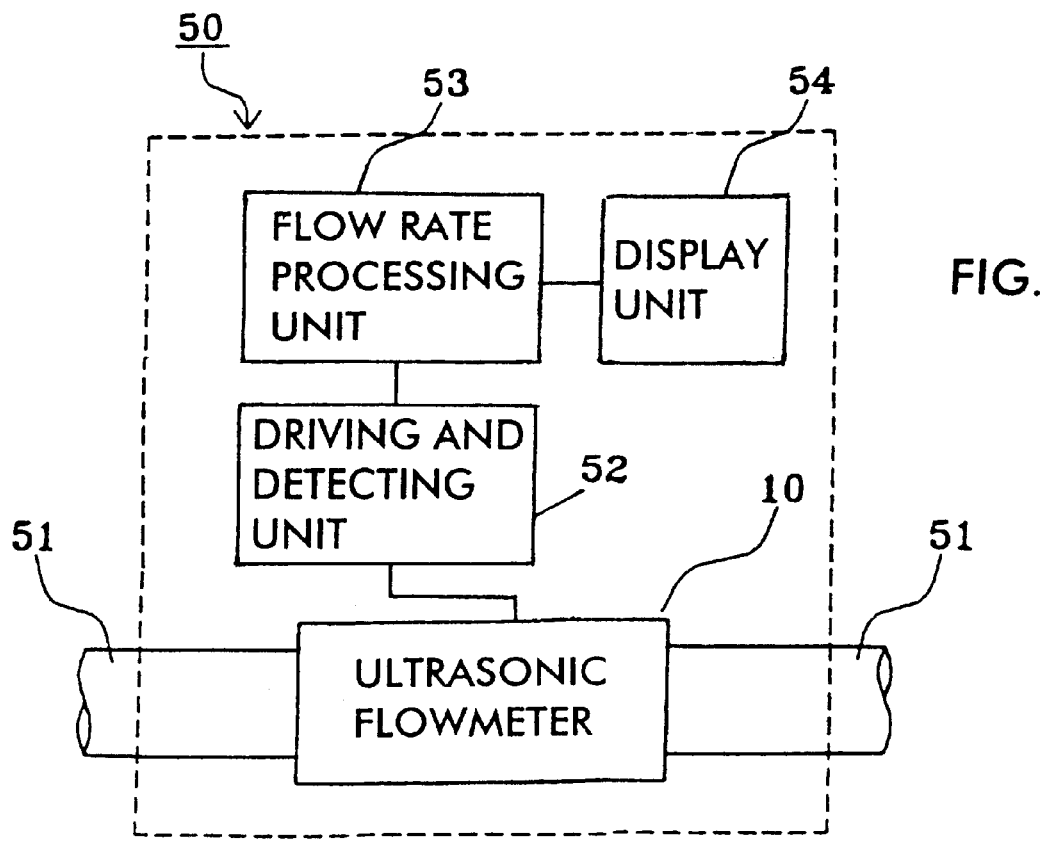
FIG. 7

ULTRASONIC FLOWMETER AND GAS FLOWMETER USING THE SAME

BACKGROUND OF THE INVENTION

1. Field of the Invention

The present invention relates to an ultrasonic flowmeter and a gas flowmeter using the same, particularly, to an ultrasonic flowmeter for measuring the flow rate of a gas, a liquid, and the like by using an ultrasonic sensor and a gas flowmeter using the same.

2. Description of the Related Art

FIG. 8 shows a conventional ultrasonic flowmeter. An ultrasonic flowmeter 1 shown in FIG. 8 includes a fluid duct 2, and ultrasonic sensors 3 and 4 provided on the inner wall of the fluid duct 2. The ultrasonic sensors 3 and 4 are disposed opposing each other in a direction inclined by a predetermined angle with respect to a line perpendicular to the path of flow in the fluid duct 2. Each of the ultrasonic sensors 3 and 4 serves for generating and receiving ultrasonic waves.

In the thus configured ultrasonic flowmeter 1, the ultrasonic sensor 3 is located upstream and the ultrasonic sensor 4 is located downstream of a gas G which flows in the fluid duct 2 at a certain speed.

The ultrasonic sensors 3 and 4 simultaneously generate pulsed ultrasonic waves A and B, respectively, which are received by the ultrasonic sensors 4 and 3, respectively. In this case, time $T_a$ taken for the ultrasonic wave A to be transmitted from the ultrasonic sensor 3 to the ultrasonic sensor 4 is shorter than time $T_b$ taken for the ultrasonic wave B to be transmitted from the ultrasonic sensor 4 to the ultrasonic sensor 3, because the ultrasonic wave A follows the stream of the gas G while the ultrasonic wave B is against the stream. The difference between the times $T_a$ and $T_b$ is proportional to the speed of flow of the gas G.

Therefore, by detecting the difference between the times $T_a$ and $T_b$, the speed of flow of the gas G can be measured, and when the cross-sectional area of the fluid duct 2 is known, the flow rate of the gas G can be measured with the speed of flow thereof.

A problem in the conventional ultrasonic flowmeter 1 is that a reduction in cost has not been possible because two ultrasonic sensors are required. Because of the two ultrasonic sensors being required, an additional controlling process is required so as to make the characteristics of the two ultrasonic sensors uniform, since the variation in characteristics between the two ultrasonic sensors deteriorates the measuring accuracy of the flowmeter. Another process is additionally required for selecting ultrasonic sensors having uniform characteristics, thereby preventing a reduction in cost.

SUMMARY OF THE INVENTION

Accordingly, it is an object of the present invention to provide an ultrasonic flowmeter and a gas flowmeter using the same in which a problem caused by variations in characteristics of ultrasonic sensors is solved, whereby a reduction in cost is possible.

To this end, according to the present invention, an ultrasonic flowmeter comprises a loop flow-path, an ultrasonic sensor having two opposing surfaces for transmission and reception respectively which is provided in a part of the loop flow-path, and an incoming flow-path and an outgoing flow-path which are connected to the loop flow-path. The ultrasonic sensor is disposed so that ultrasonic waves to be transmitted and received have vector components in the direction of path in the loop flow-path.

According to the present invention, in an ultrasonic flowmeter the ultrasonic sensor blocks the loop flow-path.

According to the present invention, the ultrasonic sensor further comprising two ultrasonic sensor elements, wherein each of said ultrasonic sensor elements transmits and receives the ultrasonic waves on one surface thereof, and said two ultrasonic sensor elements are joined to each other on another surface thereof.

According to the present invention, a gas flowmeter comprises any one of the above ultrasonic flowmeters.

Manufacturing cost of the ultrasonic flowmeter and the gas flowmeter using the same thus configured according to the present invention can be reduced.

BRIEF DESCRIPTION OF THE DRAWINGS

FIG. 6 is a side view showing another example of an ultrasonic sensor to be used in an ultrasonic flowmeter according to the present invention;

FIG. 7 is a block diagram showing an embodiment of a gas flowmeter according to the present invention.

DESCRIPTION OF THE PREFERRED EMBODIMENT

Figure 1:
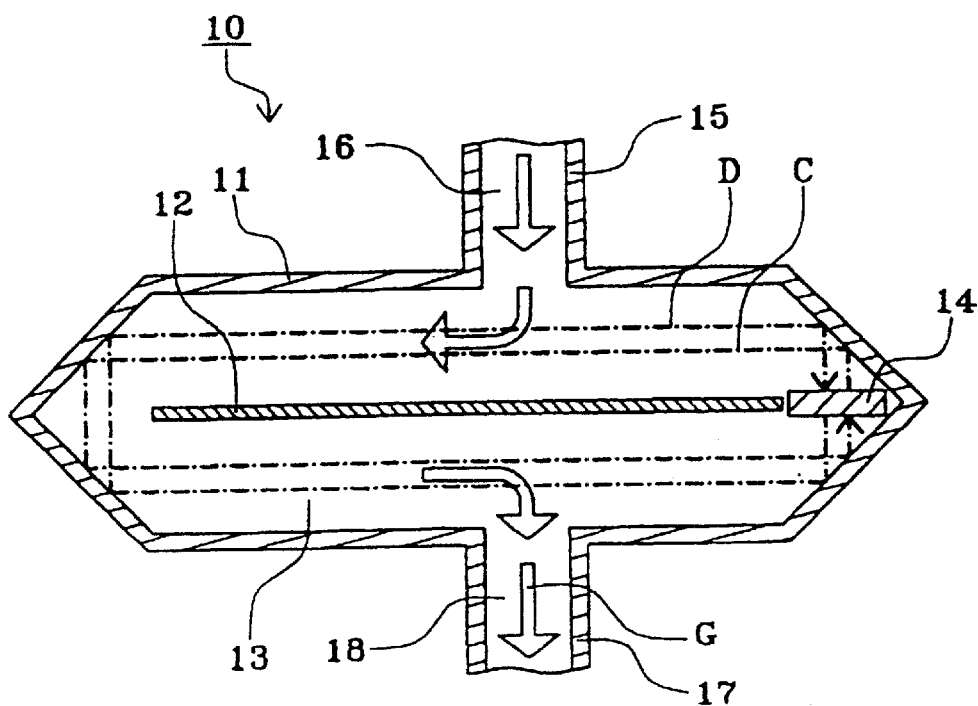
FIG. 1 is a sectional view of an embodiment of an ultrasonic flowmeter according to the present invention.

FIG. 1 shows an embodiment of an ultrasonic flowmeter according to the present invention. FIG. 1 is a sectional view of the ultrasonic flowmeter.

An ultrasonic flowmeter 10 shown in FIG. 1 includes a fluid duct 11, a partition 12, an ultrasonic sensor 14, and connecting ducts 15 and 17. In the path of flow in the fluid duct 11, a loop flow-path 13 in which a fluid can circulate is formed by the partition 12 provided therein. The two connecting ducts 15 and 17 are connected to two locations separated from each other of the fluid duct 11, and as a result, incoming and outgoing flow-paths 16 and 18 linked to the two locations of the loop flow-path are provided. The incoming flow-path 16 is formed in the connecting duct 15, and the outgoing flow-path 18 is formed in the connecting duct 17. The ultrasonic sensor 14 having two opposing surfaces for transmission and reception respectively is disposed in a part of the loop flow-path 13 so that ultrasonic waves to be transmitted and received by the ultrasonic sensor 14 have vector components in the direction of fluid path in the loop flow-path 13. The ultrasonic sensor 14 can transmit the ultrasonic waves generated thereby in the direction of path in the loop flow-path 13. In the ultrasonic flowmeter 10 shown in FIG. 1, the vector components of the ultrasonic waves which are transmitted and received by the ultrasonic sensor 14 substantially correspond with the direction of path in the loop flow-path 13.

In the ultrasonic flowmeter 10, when a gas G flows into the loop flow-path 13 through the incoming flow-path 16, the loop flow-path 13 is filled with the gas G, and then the gas G flows out through the outgoing flow-path 18. While the gas G is kept flowing into the loop flow-path 13 through the incoming flow-path 16, the gas G is kept flowing from the incoming flow-path 16 to the outgoing flow-path 18 through the loop flow-path 13. In particular, when the ultrasonic sensor 14 is disposed so as to block a part of the loop flow-path 13, the major flow of a gas G from the incoming flow-path 16 to the outgoing flow-path 18 goes through another part of the loop flow-path 13 which is not obstructed by the ultrasonic sensor 14, but the gas flowing through the part of the loop flow-path 13 in which the ultrasonic sensor 14 is disposed is reduced.

When pulsed ultrasonic waves are outputted from the two opposing surfaces of the ultrasonic sensor 14, an ultrasonic wave C and an ultrasonic wave D travel in the loop flow-path 13 in opposite directions to each other and reach the surfaces of the ultrasonic sensor 14 where the ultrasonic wave D and the ultrasonic wave C were outputted, respectively. The ultrasonic waves C and D are received by the ultrasonic sensor 14 which has been switched into a receiving mode after having outputted the pulsed ultrasonic waves C and D.

In this case, the gas G flows in a part of the loop flow-path 13 in the same direction as the ultrasonic wave C travels. Therefore, the speed of the ultrasonic wave C is greater than the speed of the ultrasonic wave D in the part of the loop flow-path 13. In the part of the loop flow-path 13 where the gas does not flow, the speeds of the ultrasonic waves C and D are the same.

The ultrasonic wave C, which is outputted by the ultrasonic sensor 14 simultaneously with the ultrasonic wave D, returns to and is received by the ultrasonic sensor 14 earlier than the ultrasonic wave D. The difference between the time of receipt of the ultrasonic wave C and that of the ultrasonic wave D is proportional to the speed of flow of the gas G in the loop flow-path 13. Therefore, the speed and the quantity of flow of the gas G can be measured by detecting the difference between the time of receipt of each of the ultrasonic waves C and D.

Figure 2:
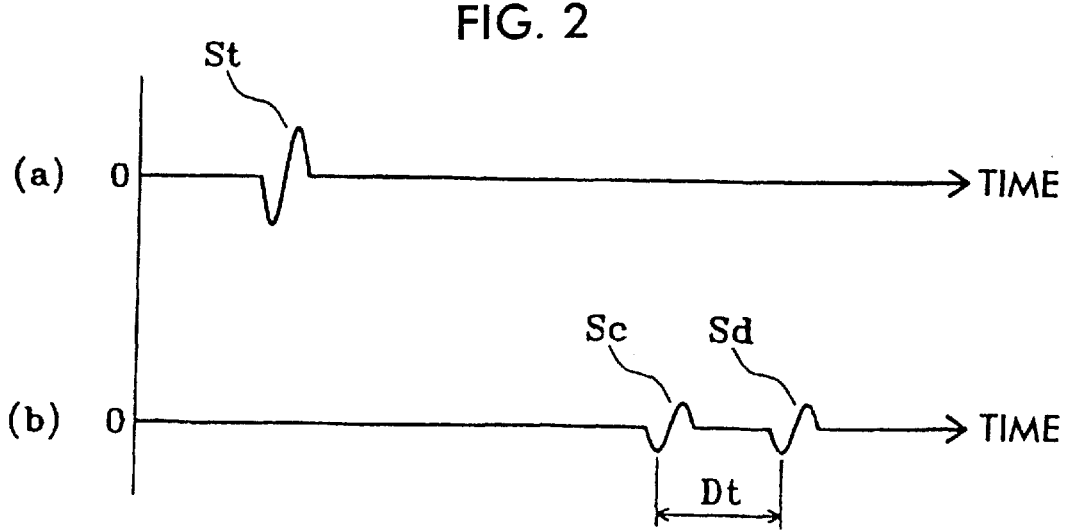
FIG. 2 is a graph showing the time dependence of an output signal and an input signal of the embodiment of an ultrasonic flowmeter according to the present invention.

FIG. 2 shows the relationship in time between a signal outputted and signals inputted as ultrasonic waves from and to the ultrasonic sensor 14. In FIG. 2, the output signal is shown on a line (a), and the input signals are shown on a line (b).

As shown in FIG. 2, a pulsed signal $S_t$ is transmitted in such a manner that the signal $S_t$ is outputted by the ultrasonic sensor 14 as the ultrasonic waves C and D which are transmitted through the loop flow-path 13 and received by the ultrasonic sensor 14. In this case, the ultrasonic wave C which reaches the ultrasonic sensor 14 earlier than the other is received thereby as an input signal $S_c$. The ultrasonic wave D, which reaches the ultrasonic sensor 14 later than the ultrasonic wave C, is received by ultrasonic sensor 14 as an input signal $S_d$. There is a difference $D_t$ in time between the $S_c$ and $S_d$. As described above, the difference $D_t$ in time is proportional to the speed of flow of the gas G; therefore, be detecting the difference $D_t$ in time, the speed and the quantity of flow of the gas G can be measured.

In the ultrasonic flowmeter 10, when the path of flow of the connecting duct 17 becomes an incoming flow-path and the path of flow of the connecting duct 15 becomes an outgoing flow-path, that is, when a gas G flows from the connecting duct 17 to the connecting duct 15, the ultrasonic wave D reaches the ultrasonic sensor 14 earlier than the ultrasonic wave C. Therefore, the signal $S_d$ is inputted to the ultrasonic sensor 14 earlier than the signal $S_c$. In this case, the speed and the quantity of flow of the gas G can be measured in the same way.

Figure 3A:
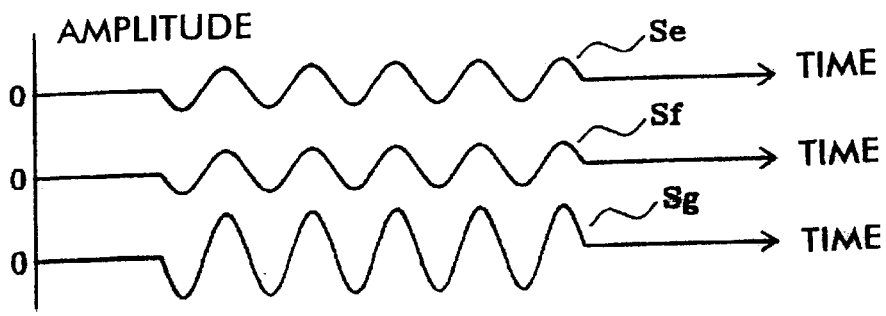
FIGS. 3A, 3B, and 3C are the graphs of the time dependence of the other output signals and input signals of the embodiment of an ultrasonic flowmeter according to the present invention.
Figure 3B:
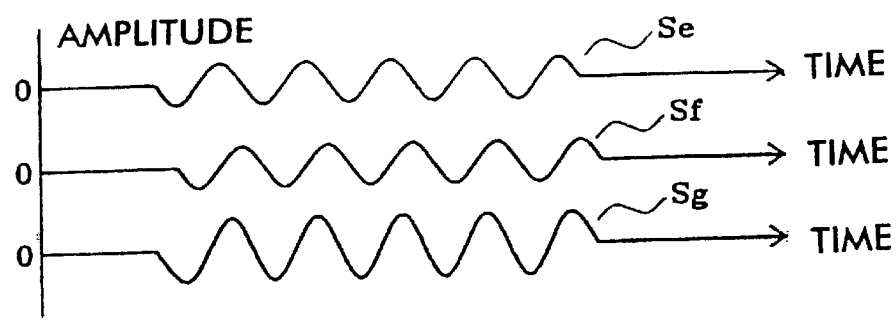
Figure 3C:
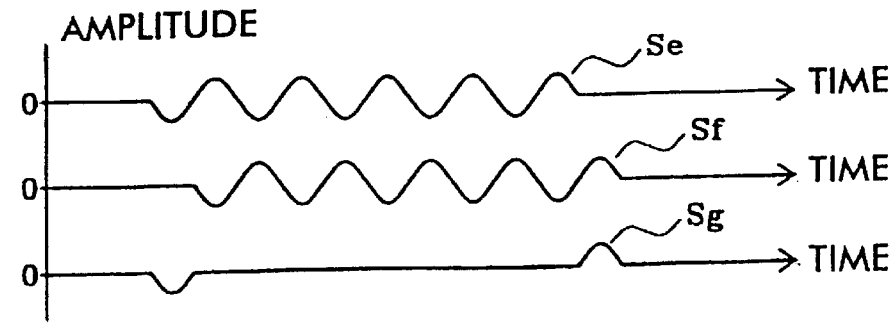

Although the ultrasonic sensor 14 generates pulsed ultrasonic waves in the above-described embodiment, the ultrasonic waves may be generated in a burst mode by the ultrasonic sensor 14, in which a plurality of waves are outputted simultaneously. Each of FIGS. 3A, 3B, and 3C shows waveforms, when the ultrasonic sensor 14 generates ultrasonic waves in a burst mode, of an input signal $S_e$ of an ultrasonic wave E transmitted in the same direction as the flow of the gas G through the loop flow-path 13, an input signal $S_f$ of an ultrasonic wave F transmitted in the opposite direction to the flow of the gas G through the loop flow-path 13, and an output signal $S_g$ which the ultrasonic sensor 14 outputs by receiving the signals $S_e$ and $S_f$ and combining the same. FIG. 3A shows a case in which the speed of flow of the gas G is zero. FIG. 3B shows a case in which the gas G flows at a certain speed. FIG. 3C shows a case in which the gas G flows at a speed higher than in the case shown in FIG. 3B. In FIG. 3, the horizontal axes denote time and the vertical axes denote the amplitude of the signals.

In FIG. 3A, the phases of the input signals $S_e$ and $S_f$ coincide with each other when the gas G does not flow, thereby increasing the amplitude of the output signal $S_g$ including the input signals $S_e$ and $S_f$ being combined.

In FIG. 3B, when the gas G flows at a certain speed, the input signal $S_e$ is received earlier than the input signal $S_f$, the input signals $S_e$ and $S_f$ having different phases. The amplitude of the output signal $S_g$ including the input signals $S_e$ and $S_f$ being combined is decreased compared with the case in which the gas G does not flow, because some portions of the input signals $S_e$ and $S_f$ cancel each other .

In FIG. 3C, when the gas G flows at a speed higher than in the case shown in FIG. 3B, a greater deviation in phase between the input signals $S_e$ and $S_f$ occurs, and in some occasions, to an extent in which the phases are deviated from each other by a half cycle. In this case, the amplitude of the output signal $S_g$ is very small because the input signals $S_e$ and $S_f$ forming the output signal $S_g$ mostly cancel each other.

The speed of flow of the gas G can be detected not only by using the difference in time between the input signals received by the ultrasonic sensor 14, but also by using the amplitude of the signals outputted by the ultrasonic sensor 14.

As described above, in the ultrasonic flowmeter 10 according to the present invention, the quantity of flow can be measured by using one ultrasonic sensor, thereby reducing the manufacturing cost compared with the conventional ultrasonic flowmeter using two ultrasonic sensors. The reduction in manufacturing cost of the ultrasonic flowmeter is also possible because it is not necessary to consider the variations in characteristics of ultrasonic sensors since a configuration with one ultrasonic sensor is used.

Figure 4:
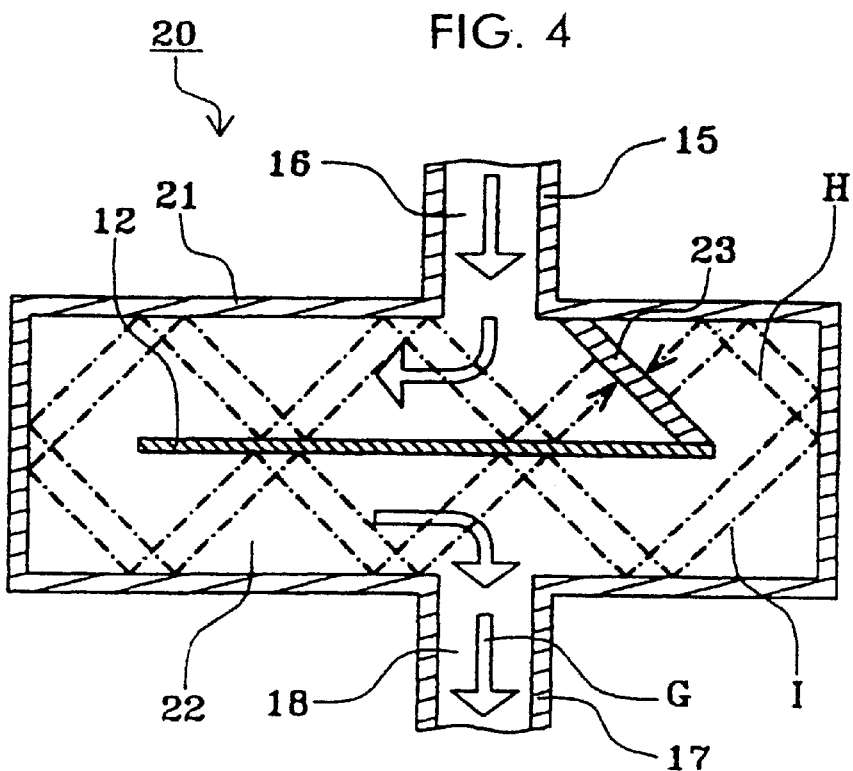
FIG. 4 is a sectional view of another embodiment of an ultrasonic flowmeter according to the present invention.

FIG. 4 shows another embodiment of an ultrasonic flowmeter according to the present invention. In FIG. 4, the same reference numerals are given to the same or equivalent portions as in FIG. 1 and their explanation is omitted.

An ultrasonic flowmeter 20 shown in FIG. 4 includes a fluid duct 21 of nearly a rectangular shape, and a loop flow-path 22 formed by a partition 12 provided in the path of flow of the fluid duct 21. An ultrasonic sensor 23 having two opposing surfaces for transmission and reception respectively is disposed in a part of the loop flow-path 22 so as to completely intercept the loop flow-path 22. The ultrasonic sensor 23 is disposed so that ultrasonic waves to be transmitted and received thereby are inclined about 45 degrees with respect to the fluid flow direction of the loop flow-path 22.

In the thus configured ultrasonic flowmeter 20, because a part of the loop flow-path 22 is completely intercepted by the ultrasonic sensor 23, a gas flowing in through an incoming flow-path 16 flows out through an outgoing flow-path 18 via the path of the loop flow-path 22 which is not intercepted at all by the ultrasonic sensor 23.

Pulsed ultrasonic waves are outputted from the two opposing surfaces of the ultrasonic sensor 23. An ultrasonic wave H and an ultrasonic wave I travel in the loop flow-path 22 in opposite directions while the ultrasonic waves H and I are reflected by the inner wall of the fluid duct 21 and the partition 12, and after having circulated through the loop flow-path 22 the ultrasonic waves H and I reach and are received by the surfaces of the ultrasonic sensor 23 which outputted the ultrasonic waves I and H.

In this case, the quantity of flow of the gas G can be also measured by detecting the difference between the times of receipt of each of the ultrasonic waves H and I as in the case of the ultrasonic flowmeter 10.

Thus, even if the vector components of the ultrasonic waves which are transmitted and received by the ultrasonic sensor 23 are not completely in accordance with the fluid flow direction of the loop flow-path 22, if any of vector components thereof accord with the flow direction of the loop flow-path 22, the ultrasonic waves can circulate through the loop flow-path 22, and then it is possible to measure the quantity of flow by detecting the difference between the times of receipt of the ultrasonic waves.

In the ultrasonic flowmeter 20, because the ultrasonic sensor 23 completely intercepts a part of the loop flow-path 22, a gas G flows only in one direction, and accordingly it is possible to measure the quantity of flow of the gas G with a high degree of precision.

In the ultrasonic flowmeters 10 and 20, a loop flow-path has been arranged by a partition provided in the fluid duct, but this is not limited to, and, for example, a fluid duct may be formed in the shape of a doughnut.

In the ultrasonic flowmeters 10 and 20, the quantity of flow of a gas was measured, but this is not limited to, and the quantity of flow of a liquid, a powder, and the like can be measured in the same way.

Figure 5:
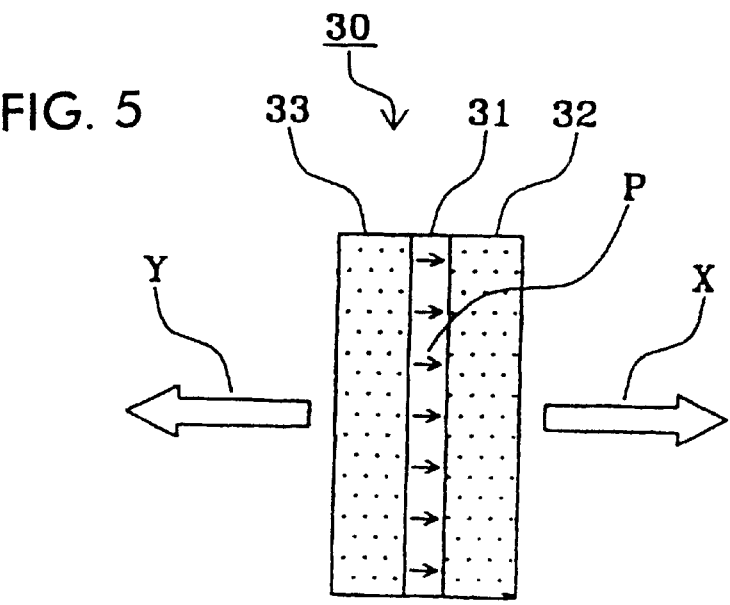
FIG. 5 is a side view showing an example of an ultrasonic sensor to be used in an ultrasonic flowmeter according to the present invention.
Figure 8:
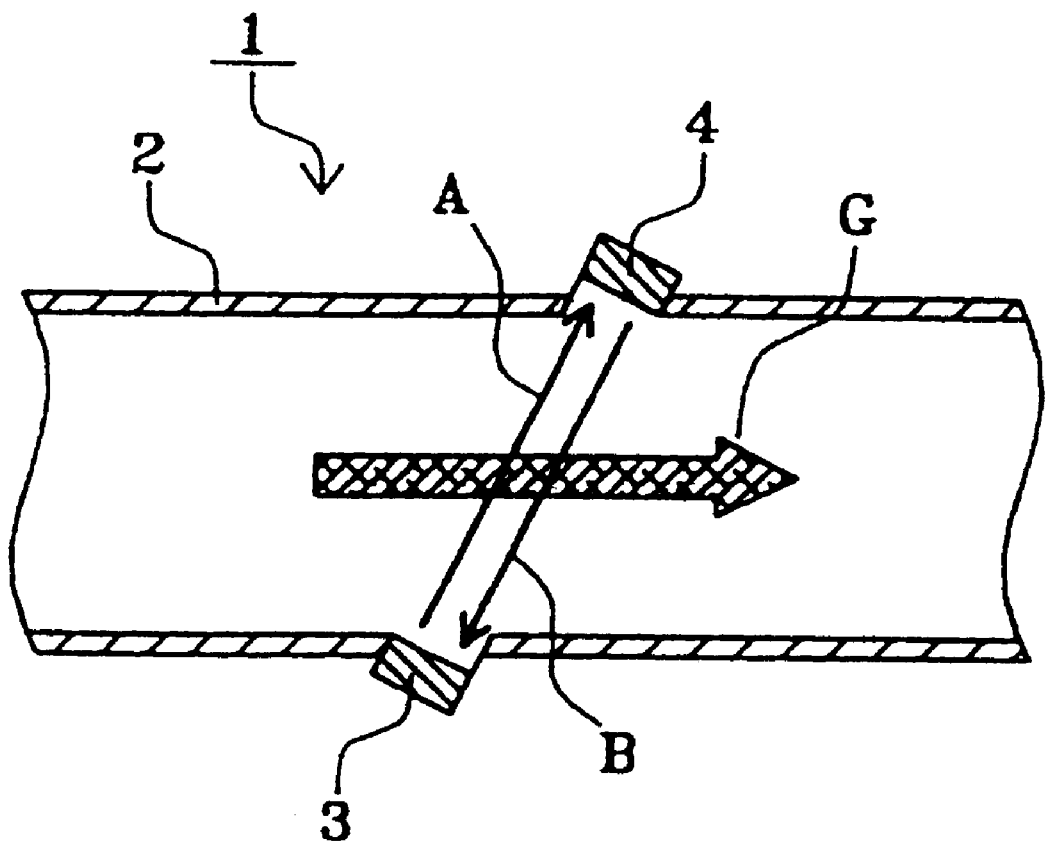
FIG. 8 is a sectional view showing a conventional ultrasonic flowmeter.

In the ultrasonic flowmeter 10 shown in FIG. 1 and the ultrasonic flowmeter 20 shown in FIG. 4, the ultrasonic sensors 14 and 23 having two opposing surfaces for transmission and reception are used. FIG. 5 shows a construction of such ultrasonic sensors concretely.

An ultrasonic sensor 30 shown in FIG. 5 includes a piezoelectric material 31 and acoustic matching layers 32 and 33 provided on the two opposing surfaces of the piezoelectric material 31, respectively. The piezoelectric material 31 is polarized between the two opposing surfaces. The direction of the polarization is shown by arrows P in FIG. 5.

In the ultrasonic sensor 30, when an electrical signal is applied to the piezoelectric material, ultrasonic waves are outputted in the two directions to the acoustic matching layers 32 and 33 from the piezoelectric material 31, that is, in the directions of X and Y which are opposite to each other as shown in FIG. 5. When the ultrasonic waves are received, the conditions are the same, that is, the ultrasonic waves are received from the sides where the acoustic matching layers 32 and 33 are provided. In this way, the ultrasonic sensor 30 having two opposing surfaces for transmission and reception can be formed.

Ultrasonic sensors having two opposing surfaces for transmission and reception are not limited to the ultrasonic sensor 30 shown in FIG. 5. In FIG. 6, the construction of another ultrasonic sensor having the same function is concretely shown.

An ultrasonic sensor 40 shown in FIG. 6 includes an ultrasonic sensor element where an acoustic matching layer 42 is provided on one surface of a piezoelectric material 41, an ultrasonic sensor element where an acoustic matching layer 44 is provided on one surface of a piezoelectric material 43, and an elastic material 45 through which surfaces of the piezoelectric materials having no acoustic matching layer thereon are stuck together.

In the ultrasonic sensor 40, ultrasonic waves are outputted from the two ultrasonic sensor elements in the directions of X and Y where the acoustic matching layers 42 and 44 are provided, respectively, and ultrasonic waves are similarly received from the directions of X and Y where the acoustic matching layers 42 and 44. In this way, the ultrasonic sensor 40 having two opposing surfaces for transmission and reception can be formed.

Although the piezoelectric materials 41 and 43 are provided with the acoustic matching layers 42 and 44 in the ultrasonic sensor 40 shown in FIG. 6, ultrasonic sensors for ultrasonic waves of relatively low frequencies do not necessarily require such acoustic matching layers and, for example, vibrating plates may be used instead of the acoustic matching layers.

FIG. 7 shows an embodiment of a gas flowmeter according to the present invention.

A gas flowmeter 50 shown in FIG. 7 includes an ultrasonic flowmeter 10 according to the present invention provided in the middle of a gas pipe 51, a driving and detecting unit 52 connected to the ultrasonic flowmeter 10, a flow rate processing unit 53 connected to the driving and detecting unit 52, and a display unit 54 connected to the flow rate processing unit 53.

In the thus configured gas flowmeter 50, the ultrasonic flowmeter 10 outputs a signal corresponding to the quantity of flow of a gas flowing in the gas pipe 51. The driving and detecting unit 52 detects the signal outputted from the ultrasonic flowmeter 10 and supplies the detected signal to the flow rate processing unit 53. The flow rate processing unit 53 integrates the quantity of flow with the passage of time and makes the display unit 54 display the results.

With the gas flowmeter 50, the precision of the measurement of the quantity of flow is increased and manufacturing costs of the gas flowmeter can be reduced because an ultrasonic flowmeter 10 according to the present invention is used.

The ultrasonic flowmeter according to the present invention includes an ultrasonic sensor having two surfaces for transmission and reception which is provided in a part of a loop flow-path, an incoming flow-path, and an outgoing flow-path. The ultrasonic sensor is arranged so that the ultrasonic waves transmitted and received by the ultrasonic sensor have vector components in the direction of the loop flow-path. With such a arrangement, an ultrasonic flowmeter using one ultrasonic sensor is made possible, thereby reducing manufacturing costs of the ultrasonic flowmeter.

Because of the ultrasonic sensor provided so as to intercept a part of a loop flow-path, the precision of the measurement of the quantity of flow can be improved.

According to the gas flowmeter of the present invention, by using the ultrasonic flowmeter according to the present invention, it is made possible to measure the quantity of flow with a high degree of precision and reduce manufacturing costs of the gas flowmeter.

What is claimed is:

1. An ultrasonic flowmeter comprising:
   a loop flow-path,
   an ultrasonic sensor having two opposing surfaces for transmission and reception respectively which is provided in a part of the loop flow-path, and
   an incoming flow-path and an outgoing flow-path which are connected to the loop flow-path, wherein the ultrasonic sensor is disposed so that ultrasonic waves to be transmitted and received contains vector components in the direction of path in the loop flow-path.

2. An ultrasonic flowmeter as claimed in claim 1, wherein the ultrasonic sensor blocks the loop flow-path.

3. An ultrasonic flowmeter as claimed in claim 1 or 2,
   the ultrasonic sensor further comprising two ultrasonic sensor elements,
   wherein each of said ultrasonic sensor elements transmits and receives the ultrasonic waves on one surface thereof, and said two ultrasonic sensor elements are joined to each other on another surface thereof.

4. A gas flowmeter comprising an ultrasonic flowmeter as claimed in claim 3.

5. A gas flowmeter comprising an ultrasonic flowmeter as claimed in claim 1 or 2.

* * * * *